United States Patent
Takei

(10) Patent No.: US 9,219,506 B2
(45) Date of Patent: Dec. 22, 2015

(54) WIRELESS TRANSMITTER, WIRELESS RECEIVER, WIRELESS COMMUNICATION SYSTEM, ELEVATOR CONTROL SYSTEM, AND TRANSFORMER EQUIPMENT CONTROL SYSTEM

(75) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/122,924

(22) PCT Filed: Jun. 1, 2011

(86) PCT No.: PCT/JP2011/062576
§ 371 (c)(1),
(2), (4) Date: Nov. 27, 2013

(87) PCT Pub. No.: WO2012/164697
PCT Pub. Date: Dec. 6, 2012

(65) Prior Publication Data
US 2014/0112409 A1    Apr. 24, 2014

(51) Int. Cl.
*H04B 7/02* (2006.01)
*H04B 1/04* (2006.01)
(Continued)

(52) U.S. Cl.
CPC ............ *H04B 1/0475* (2013.01); *H04B 1/0483* (2013.01); *H04B 1/1081* (2013.01); *H04J 11/0063* (2013.01); *H04L 27/12* (2013.01); *H04L 27/14* (2013.01)

(58) Field of Classification Search
CPC ............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS 5,369,800 A    11/1994    Takagi et al.
6,009,073 A    12/1999    Kaneko
(Continued)

FOREIGN PATENT DOCUMENTS

CN    1158040 A    8/1997
CN    1240040 A    12/1999
(Continued)

OTHER PUBLICATIONS

Corresponding International Search Report with English Translation dated Jul. 12, 2011 (three (3) pages).
(Continued)

*Primary Examiner* — Adolf Dsouza
(74) *Attorney, Agent, or Firm* — Crowell & Moring LLP

(57) ABSTRACT

A wireless transmitter transmits a first transmission wave having a first carrier frequency (f0+Δf), modulated by a modulator with an information signal having a frequency band f1 which is predetermined, from a transmitting antenna, and transmits a second transmission wave having a second carrier frequency (f0−Δf), modulated by a modulator with such information signal. An average frequency f0 between the first carrier frequency (f0+Δf) and the second carrier frequency (f0−Δf) is kept constant, whereas the first carrier frequency (f0+Δf) and the second carrier frequency (f0−Δf) are varied by controlling a frequency difference Δf to vary.

13 Claims, 12 Drawing Sheets

(51) Int. Cl.
  *H04B 1/10* (2006.01)
  *H04J 11/00* (2006.01)
  *H04L 27/12* (2006.01)
  *H04L 27/14* (2006.01)

(56) References Cited

U.S. PATENT DOCUMENTS

| | | | |
|---|---|---|---|
| 6,061,020 A | 5/2000 | Ishijima et al. | |
| 6,389,059 B1* | 5/2002 | Smith et al. | 375/141 |
| 6,525,649 B1 | 2/2003 | Ueda et al. | |
| 2002/0019217 A1 | 2/2002 | Wasko | |
| 2002/0102951 A1* | 8/2002 | Nakano et al. | 455/118 |
| 2004/0017847 A1 | 1/2004 | Alberth, Jr. et al. | |
| 2008/0132183 A1* | 6/2008 | Usuda et al. | 455/101 |
| 2009/0109001 A1 | 4/2009 | Watanabe et al. | |

FOREIGN PATENT DOCUMENTS

| | | |
|---|---|---|
| CN | 1672333 A | 9/2005 |
| CN | 101425150 A | 5/2009 |
| JP | 61-24339 U | 2/1986 |
| JP | 10-135919 A | 5/1998 |
| JP | 2007-221303 A | 8/2007 |
| JP | 2007-251989 A | 9/2007 |
| WO | WO 2006/049127 A1 | 5/2006 |

OTHER PUBLICATIONS

Japanese-language Written Opinion dated Jul. 12, 2011 (PCT/ISA/237) (three (3) pages).

U.S. Appl. No. 14/002,521, filed Aug. 30, 2013.

Chinese Office Action dated Aug. 22, 2014, (ten (10) pages).

* cited by examiner

FIG. 3A
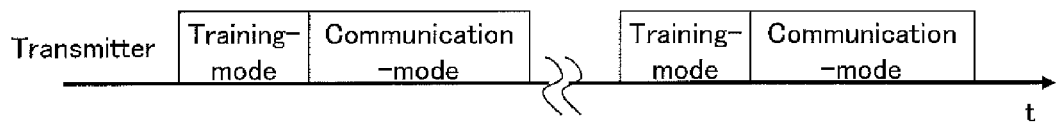
FIG. 3B
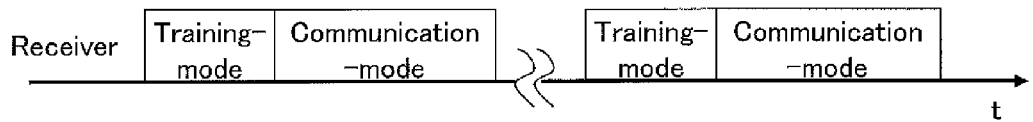
FIG. 3C
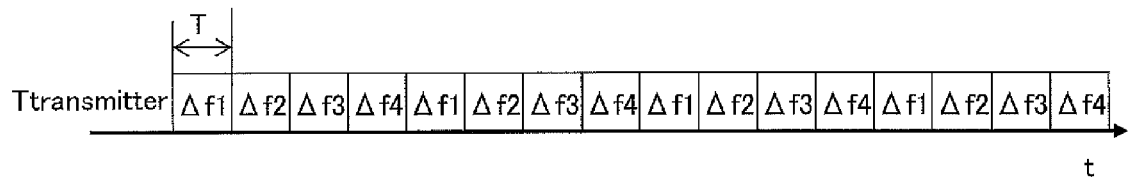
FIG. 3D
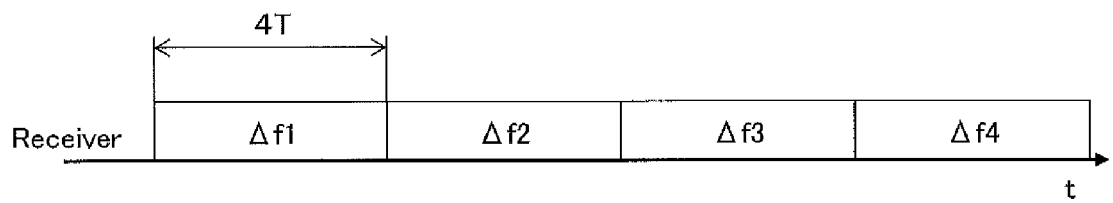
FIG. 3E
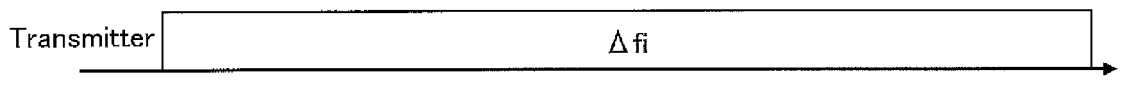
FIG. 3F
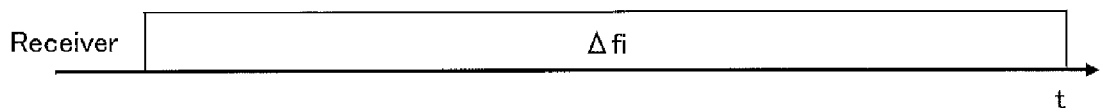
FIG. 3G     FIG. 3H
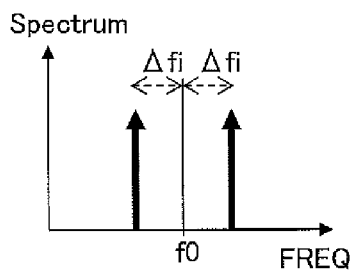 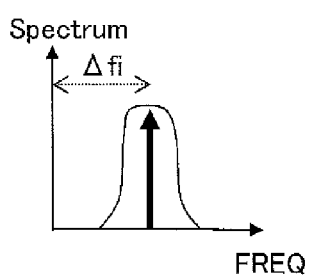

WIRELESS TRANSMITTER, WIRELESS RECEIVER, WIRELESS COMMUNICATION SYSTEM, ELEVATOR CONTROL SYSTEM, AND TRANSFORMER EQUIPMENT CONTROL SYSTEM

TECHNICAL FIELD

The present invention relates to a wireless transmitter, a wireless receiver, and a wireless communication system that have long-life operations for realizing highly reliable radio communications. Particularly, in a situation that an environment where a wireless transmitter and a wireless receiver are installed includes obstacles that reflect and scatter radio waves, the invention relates to a wireless transmitter, a wireless receiver, a wireless communication system, an elevator control system, and an transformer equipment control system that are capable of suppressing a decrease in sensitivity due to reflection multi-path interference of generated by the obstacles.

BACKGROUND ART

Recently, wireless communication technology has developed significantly in the fields of broadcasting and communication and has overcome problems regarding reliability such as momentary disconnection that is specific to wireless. Consequently, application of the wireless communication technology to the fields of control and measurement in which higher reliability is demanded than in the fields of broadcasting and communication is underway.

In the fields of control and measurement, especially, equipment that builds a social infrastructure (hereinafter referred to as "social infrastructure equipment") is demanded to have, particularly, higher reliability of communication quality and higher reliability of communication equipment, in other words, long-life operations, as compared with general consumer equipment in the fields of broadcasting and communication. Social infrastructure equipment includes, for example, an elevator system which is depicted in FIG. 12 and an transformer equipment control system which is depicted in FIG. 13, among others.

Social infrastructure equipment is overwhelmingly large in size, as compared with general consumer equipment, and is made robustly of metal members. This social infrastructure equipment itself becomes a scatter of electromagnetic waves. Hence, wireless communication in social infrastructure equipment is often performed in an environment where multi-path interference (multi-path waves) generated by scattering interfere with each other. Therefore, it is hoped to achieve highly reliable wireless communication under the environment where interference due to multi-path interference (multi-path waves) occurs.

When a difference in distance between a plurality of electromagnetic waves traveling from a transmitting point until arriving at a receiving point is an odd multiple of a half-wave length, interference of these electromagnetic waves causes their energy toe be cancelled out to zero and makes communication impossible. This problem has heretofore been coped with by a space diversity technique in which multiple antennas are installed such that they are spatially separated by half-wave length from each other. In the space diversity technique, even if the energy of an electromagnetic wave received by one antenna becomes zero by interference, the energy of an electromagnetic wave received by another antenna installed with a distance of a half-wave length from the one antenna, is strengthened by interference, which enables reception by either antenna.

In a wireless communication environment in a social infrastructure, reflections are caused by a distribution of fixtures distributed there which are scatters. When an average distance that the reflected electromagnetic waves travel is comparable with the distance between the antennas (the distance of the half-wave length of electromagnetic waves) for realizing space diversity, it becomes very likely that the energy of electromagnetic waves arriving at the antennas becomes zero due to another interference caused by multi-path reflections. Hence, it becomes difficult to ensure the reliability of wireless communication.

In social infrastructure equipment, there is a possibility that an electromagnetic wave generated by a wireless transmitter is reflected by the social infrastructure equipment itself and turns into multi-path waves (multi-path waves) to go toward a receiver and arrive at the receiver from all directions. Hence, a large number of antennas are needed if the space diversity technique is applied. For example, even if multi-path waves (multi-path waves) are assumed to come only in all directions in a plane, it is necessary to prepare a plurality of arrayed antennas. Since the distance between adjacent antennas is the half-wave length of electromagnetic waves to receive, there is a possibility of exceeding a scale to which antennas can be provided on the social infrastructure equipment.

In Patent Literature 1 (Japanese Unexamined Patent Application Publication No. Hei 10(1998)-135919), particularly, in Abstract and FIG. 3, there is disclosed a technique in which the polarization plane of radio waves is rotated to suppress the influence of fading and noise in wireless communication. Besides, paragraph 0006 of the specification of Patent Literature 1 discloses that "comprises, at a transmitting end, two pairs of dipole antennas arranged to intersect at a right angle and extended perpendicularly to a direction of transmission in order to transmit radio waves, rotating their polarization plane and a transmitting device having dual balanced modulation outputs for exciting these antennas, further comprising, at a receiving end, a receiving device that receives incoming radio waves, detecting their rotated polarization plane".

In Patent Literature 2 (Japanese Unexamined Patent Application Publication No. Sho 61(1986)-024339), there is described a method that uses two carriers having different frequencies as a first frequency without using the third frequency, makes each carrier carry different pieces of information through the use of a second frequency, transmits these two carriers by using different polarizations, and detects a frequency of a difference between the frequencies of the two carriers as a third frequency at a receiver.

CITATION LIST

Patent Literature

Patent Literature 1: Japanese Unexamined Patent Application Publication No. Hei 10(1998)-135919
Patent Literature 2: Japanese Unexamined Patent Application Publication No. Sho 61(1986)-024339

SUMMARY OF INVENTION

Technical Problem

The invention of Patent Literature 1 is effective for eliminating the influence of fading and noise that occur in transmitting and receiving radio waves. However, that invention does not have a description of achieving highly reliable wireless communication under an environment where interference due to multiple beams (multi-path waves) occurs and downsizing transmitting antennas and receiving antennas.

The invention of Patent Literature 1 can be applied to an analog modulation method such as FM (Frequency Modulation) without requiring a pilot signal wave, structure is simple, and compensation for each signal wave for communication is easy. However, that invention does not discuss digital processing of information signals after detecting a given frequency component in the receiver.

Therefore, the present invention aims to provide a wireless transmitter, a wireless receiver, a wireless communication system, an elevator control system, and an transformer equipment control system that are capable of improving the reliability of digital radio communication affected by multi-path interference under an environment where there are a plurality of objects that scatter electromagnetic waves.

Solution to Problem

In order to address the above problem and achieve an object of the present invention, the invention has been configured as follows:

A wireless transmitter transmitting a first transmission wave having a first carrier frequency, modulated with an information signal having a predetermined frequency band and a second transmission wave having a second carrier frequency, modulated with the information signal, characterized in that an average frequency between the first carrier frequency and the second carrier frequency is kept constant, whereas the first carrier frequency and the second carrier frequency are varied.

Other means will be described in the embodiments for carrying out the invention.

Advantageous Effects of Invention

According to the present invention, it is possible to provide a wireless transmitter, a wireless receiver, a wireless communication system, an elevator control system, and an transformer equipment control system that are capable of improving the reliability of digital radio communication affected by multi-beam interference under an environment where there are a plurality of objects that scatter electromagnetic waves.

BRIEF DESCRIPTION OF DRAWINGS

FIGS. 3A to 3H are diagrams depicting operation of the wireless communication system according to the second embodiment.

DESCRIPTION OF EMBODIMENTS

Figure 1A:
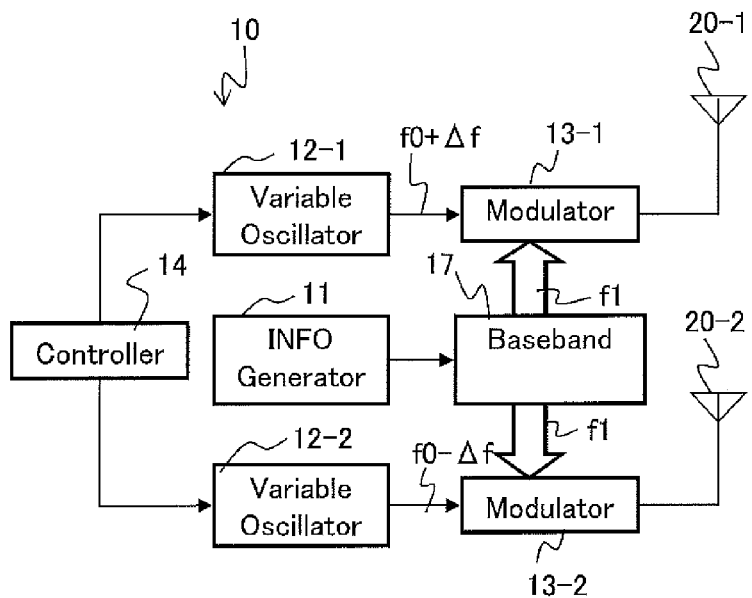
FIGS. 1A to 1D are diagrams depicting a configuration of a wireless communication system according to a first embodiment.
Figure 1B:
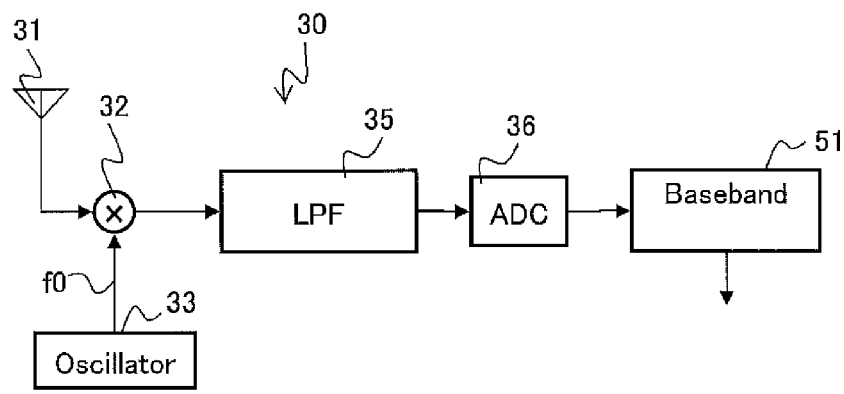
Figure 1C:
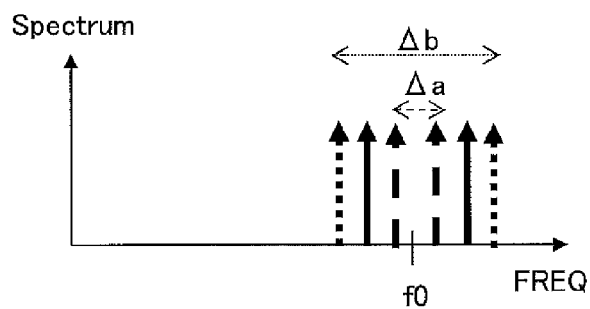
Figure 1D:
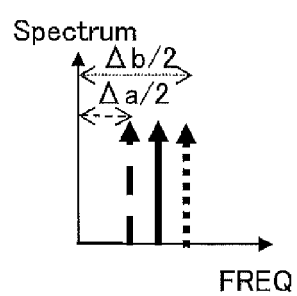

In the following, embodiments for carrying out the present invention (referred to as the "embodiments") will be described in detail with reference to the drawings and the like.
Configuration of First Embodiment FIGS. 1A through 1D are diagrams depicting a configuration of a wireless communication system according to a first embodiment. FIG. 1A depicts a wireless transmitter 10 of the present embodiment. FIG. 1B depicts a wireless receiver 30 of the present embodiment. FIG. 1C depicts the power spectrum of transmission signals of the wireless transmitter 10 of the present invention. FIG. 1D depicts the power spectrum of output signals of a low-pass filter 35.

The wireless communication system of the present embodiment includes a wireless transmitter 10 and a wireless receiver 30.

The wireless transmitter 10 depicted in FIG. 1A includes a transmission controller 14, variable oscillators 12-1, 12-2, modulators 13-1, 13-2, an information generator 11, a baseband circuit 17, and transmitting antennas 20-1, 20-2.

The output side of the transmission controller 14 is connected to the variable oscillators 12-1, 12-2. The output side of the variable oscillator 12-1 is connected to the modulator 13-1. The output side of the variable oscillator 12-2 is connected to the modulator 13-2. The output side of the information generator 11 is connected to the baseband circuit 17. The output sides of the baseband circuit 17 are connected to the modulators 13-1, 13-2, respectively. The output side of the modulator 13-1 is connected to the transmitting antenna 20-1. The output side of the modulator 13-2 is connected to the transmitting antenna 20-2.

The information generator 11 generates information signals. The baseband circuit 17 converts information signals input thereto into information signals having a frequency band f1 which is predetermined.

The transmission controller 14 controls the frequencies of signals outputted by the variable oscillators 12-1, 12-2. The variable oscillator 12-1 outputs a first carrier with a frequency (f0+Δf) resulting from adding a frequency difference Δf according to an output signal of the transmission controller 14 to a frequency f0.

The variable oscillator 12-2 outputs a second carrier with a frequency (f0−Δf) resulting from subtracting a frequency difference Δf according to an output signal of the transmission controller 14 from the frequency f0.

The modulator 13-1 modulates an information signal, based on an input oscillation signal that is the first carrier. The modulator 13-2 modulates an information signal, based on an input oscillation signal that is the second carrier. In the present embodiment, the frequency difference Δf is smaller than the frequency f0. Further, the predetermined frequency f1 is smaller than the frequency difference Δf. That is, f0>Δf>f1.

FIG. 1B depicts the wireless receiver 30 of the present embodiment.

The wireless receiver 30 depicted in FIG. 1B includes a receiving antenna 31, a mixer 32, an oscillator 33, a low-pass filter 35, an analog-digital converter (ADC) 36, and a baseband circuit 51.

The receiving antenna 31 receives radio waves transmitted by the transmitting antennas 20-1, 20-2. The oscillator 33 outputs an oscillation signal with the frequency f0. The mixer 32 mixes two signals input thereto and generates an output. Specifically, the mixer 32 mixes an oscillation signal of the frequency f0 and a signal received by the receiving antenna 31. This provides product detection. The low-pass filter 35 suppresses a spectral component that exceeds the predetermined frequency in an input signal and transfers a low-band spectral component. The analog-digital converter 36 converts a signal input to it to a digital signal. The baseband circuit 51 converts a digital signal input thereto into a baseband signal that is an original information signal.

The output side of the receiving antenna 31 and the output side of the oscillator 33 are connected to the mixer 32. The output line of the mixer 32 is connected via the low-pass filter 35 to the analog-digital converter 36. The output side of the ADC 36 is connected to the baseband circuit 51.

FIG. 1C depicts the power spectrum of the wireless transmitter 10 of the present invention. The abscissa of the figure represents frequency. The ordinate in the figure represents spectral density (spectrum) in relation to frequency. In some of the drawings, frequency is abbreviated to "FREQ" and spectral density is written as spectrum.

The power spectrum depicted in FIG. 1C concerns electromagnetic waves that are radiated from the transmitting antennas 20-1, 20-2. The variable oscillator 12-1 outputs a signal with a frequency (f0+Δf) around the frequency f0. The variable oscillator 12-2 outputs a signal with a frequency (f0−Δf) around the frequency f0.

A frequency difference Δb is a difference between the power spectrum peaks of electromagnetic waves that are radiated from the transmitting antennas 20-1, 20-2 when the frequency Δf is a maximum.

A frequency difference Δa is a difference between the power spectrum peaks of electromagnetic waves that are radiated from the transmitting antennas 20-1, 20-2 when the frequency Δf is a minimum.

FIG. 1D depicts the power spectrum of output signals of the low-pass filter 35 of the present embodiment. The abscissa of the figure represents frequency. The ordinate of the figure represents spectral density (spectrum) in relation to frequency.

In the present embodiment, the power spectrum of signals output from the receiving antenna 31 to the mixer 32 is transformed to a frequency equivalent to a peak frequency difference through product detection by the mixer 32. Hence, the power spectrum of output signals of the low-pass filter 35 has a peak in a range from frequency Δb/2 to frequency Δa/2.

Operation of First Embodiment

Operation of the wireless transmitter 10 of the present embodiment is described, based on FIG. 1A.

The information generator 11 generates and outputs an information signal to the baseband circuit 17. The baseband circuit 17 converts an information signal input thereto into an information signal having the frequency band f1 which is predetermined and outputs this information signal to the modulators 13-1, 13-2. The modulator 13-1 modulates the information signal having the frequency band f1 with an oscillation signal that is output by the variable oscillator 12-1 and the thus modulated signal is transmitted from the transmitting antenna 20-1. The modulator 13-2 modulates the information signal having the frequency band f1 with an oscillation signal that is output by the variable oscillator 12-2 and the thus modulated signal is transmitted from the transmitting antenna 20-2.

Electromagnetic waves radiated from the transmitting antennas 20-1, 20-2 are reflected at different incidence angles and different frequencies, when passing through a space where there are many non-specified reflecting objects. The electromagnetic waves have polarized waves, and the phase shift angle of the polarized waves changes depending on their polarization vector at different incidence angles. For example, if the polarization vector is orthogonal to the plane of incidence, the phase shift angle will be 180°. If the polarization vector is included in the plane of incidence, the phase shift angle is 0°. The electromagnetic waves with different frequencies radiated from the transmitting antennas 20-1, 20-2 experience a various number of reflections by a plurality of reflecting object through various paths and at various incidence angles. In this situation, when a frequency corresponding to a wavelength that is nearly equal to an average distance of distribution of the reflecting objects is nearly equal to a difference between two transmission frequencies, beat waves are formed on the time base at this frequency difference and the beat waves are combined in different polarization vector directions and different phases. On average, the polarization vector rotates once per reflection.

Therefore, if given multiple beams are combined at a receiving point, this rotation of the polarization vector causes the phase of a plurality of reflected wave beams arriving at the receiving point to change between 0° and 180° in a rotation period. Thus, when the rotation period is divided on the time base and the received wave power at each divided time point is observed, the set of all the split time points includes a time point at which reflected waves which are in anti-phase are combined at the receiving point and their received power is minimized and a time point at which reflected waves which are in co-phase are combined at the receiving point and their received power is strengthened together. With the aid of a digital signal processing technique or the like, by extracting such a time point at which reflected waves which are in co-phase are combined at the receiving point and their received power is maximized together, it becomes easy to ensure a radio communication path even under a radio environment where there are many reflecting objects.

Operation of the wireless receiver 30 of the present embodiment is described, based on FIG. 1B.

Linear polarization waves transmitted by the transmitting antennas 20-1, 20-2 are received by the receiving antenna 31. The received signal includes the frequencies of (f0±Δf). This received signal and an oscillation signal of the frequency f0 that is output by the oscillator 33 are mixed in the mixer 32. By this, the product detection is performed and a signal with a frequency Δf equivalent to a frequency difference between the frequencies of both signals is derived. In an output signal of the mixer 32, a signal (noise) exceeding a predetermined frequency is suppressed by the low-pass filter 35 and a signal spectrum with the frequency Δf is derived. An output signal of the low-pass filter 35 is converted into a digital signal via the analog-digital converter 36. This digital signal is converted into the original information signal by the baseband circuit 51.

According to the wireless receiver 30 of the present embodiment, the radio waves transmitted by the wireless transmitter 10, which experienced multiple reflections by a plurality of reflecting objects and arrived at the receiving antenna 31 are converted by the wireless receiver 30 into signals with the frequency $\Delta f$ that is equivalent to a difference between the carrier frequencies (f0±$\Delta f$) of two transmission waves and the frequency f0 that is output by the oscillator 33. A maximum frequency difference between the carrier frequencies (f0±$\Delta f$) of two transmission waves is a frequency $\Delta b$ and a minimum frequency difference between them is a frequency $\Delta a$. Accordingly, it is possible to extract a time point at which reflected waves in co-phase are combined at the receiving point with ease in a frequency range of ($\Delta a/2$ to $\Delta b/2$) that is significantly lower than a carrier frequency f0 of the transmission waves and it becomes easy to ensure a radio communication path in the wireless communication system.

Advantageous Effects of First Embodiment

The first embodiment described above has the following advantageous effects (A) and (B).

(A) The wireless transmitter 10 of the present embodiment transmits two electromagnetic wave transmissions having different frequencies from the transmitting antennas 20-1, 20-2. Accordingly, when the rotation period is divided on the time base and the received wave power at each split time point is observed, the set of all the divided time points includes a time point at which reflected waves which are in anti-phase are combined at the receiving point and their received power is minimized and a time point at which reflected waves which are in co-phase are combined at the receiving point and their received power is maximized together. With the aid of a digital signal processing technique or the like, by extracting such a time point at which reflected waves of the co-phase are combined at the receiving point and their received power is strengthened together, it becomes easy to ensure a radio communication path even under a radio environment where there are many reflecting objects.

(B) The wireless receiver 30 of the present embodiment makes conversion to signals with the frequency $\Delta f$ corresponding to a frequency difference between the carrier frequencies of two transmission waves. Accordingly, it is possible to extract a time point at which reflected waves in co-phase are combined at the receiving point with ease in a range of frequency $\Delta a/2$ to frequency $\Delta b/2$ that is significantly lower than a carrier frequency f0 of the transmission waves and it becomes easy to ensure a radio communication path in the wireless communication system.

Configuration of Second Embodiment

FIGS. 2A through 2D are diagrams depicting a configuration of a wireless communication system according to a second embodiment. Components corresponding to those in the wireless communication system depicted in FIGS. 1A through 1D are assigned the same reference numerals.

Figure 2A:
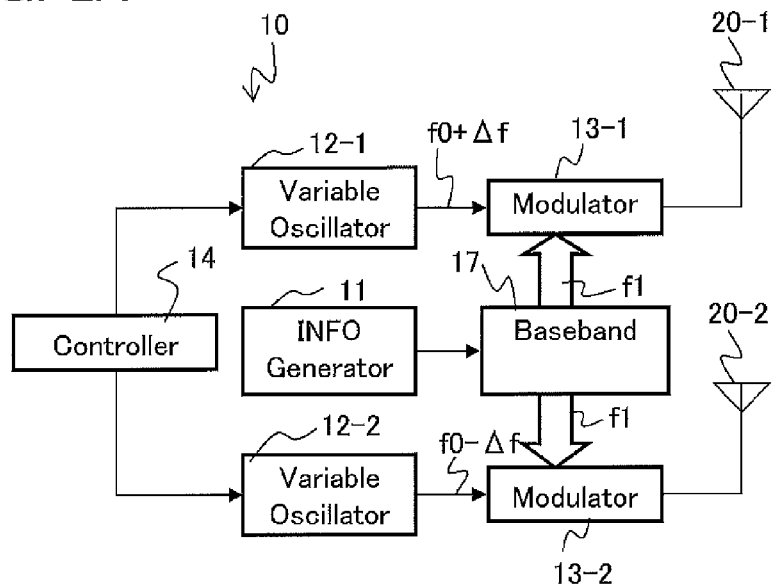
FIGS. 2A to 2D are diagrams depicting a configuration of a wireless communication system according to a second embodiment.

A wireless transmitter 10 depicted in FIG. 2A has the same configuration as the wireless transmitter 10 of the first embodiment depicted in FIG. 1A.

Figure 2B:
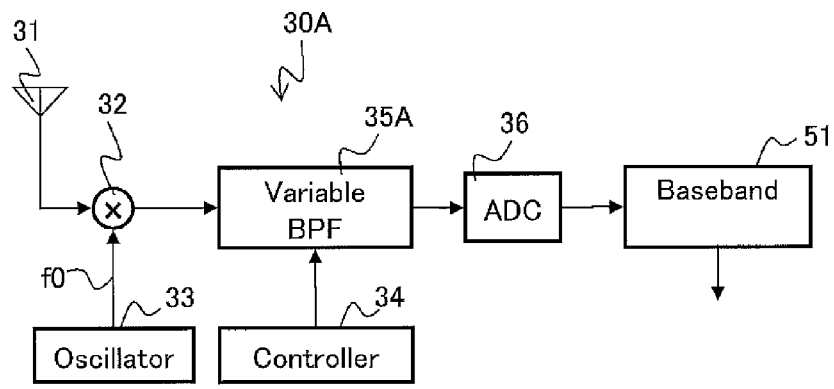

A wireless receiver 30A depicted in FIG. 2B has the same configuration as the wireless receiver 30 of the first embodiment depicted in FIG. 1B with the exception that it includes a variable band-pass filter 35A which differs from the low-pass filter 35 in the wireless receiver 30 of the first embodiment depicted in FIG. 1B.

The output side of a receiving controller 34 of the present embodiment is connected to the variable band-pass filter 35A. The receiving controller 34 varies the pass frequency band of the variable band-pass filter 35A synchronously with the period of varying the frequencies of the transmission waves used by the wireless transmitter 10.

Figure 2C:
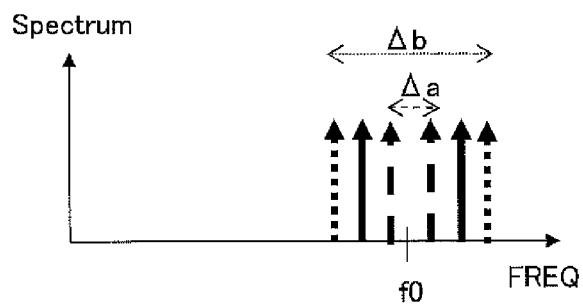

FIG. 2C depicts the power spectrum of the wireless transmitter 10 of the present embodiment. The power spectrum of the wireless transmitter 10 of the present embodiment is the same as the power spectrum of the wireless transmitter 10 of the first embodiment depicted in FIG. 1C.

Figure 2D:
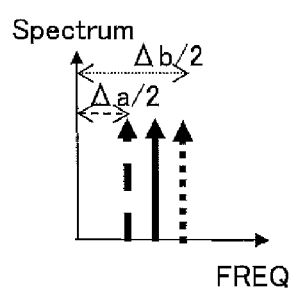

FIG. 2D depicts the power spectrum of output signals of the variable band-pass filter 35A of the present embodiment. The power spectrum of output signals of the variable band-pass filter 35A of the present embodiment is the same as the power spectrum of output signals of the low-pass filter 35 of the first embodiment depicted in FIG. 1D.

Operation of Second Embodiment

FIGS. 3A through 3H are diagrams depicting operation of the wireless communication system according to the second embodiment.

FIG. 3A depicts a predetermined sequence in which the wireless transmitter 10 repeats a training mode and a communication mode. FIG. 3B depicts a predetermined sequence in which the wireless receiver 30A repeats a training mode and a communication mode. The abscissa of FIGS. 3A and 3B represents time t which is common to the transmitter and the receiver.

Upon starting communication, the wireless transmitter 10 operates in the training mode in which the wireless transmitter 10 trains to seek an optimum frequency for a given time and then transits into the communication mode in which the wireless transmitter 10 performs communication at the optimum frequency. Similarly, the wireless receiver 30A operates in the training mode in which the wireless receiver 30A trains to seek an optimum frequency for a given time and then transmits into the communication mode in which the wireless receiver 30A performs communication at the optimum frequency. Here, the optimum frequency is a frequency that is least affected by multi-path interference and, thus, the frequency in which the component of frequency f0 becomes maximum after filtered by the variable band-pass filter 35A.

FIG. 3C depicts a detailed sequence of the training mode of the wireless transmitter 10. FIG. 3D depicts a detailed sequence of the training mode of wireless receiver 30A. The abscissas of FIGS. 3C and 3D represent time t which is common to the transmitter and the receiver.

In the training mode, the transmission controller 14 of the wireless transmitter 10 makes switching of oscillator frequency for every time T to each oscillate the variable oscillators 12-1, 12-2 in order of (f0±$\Delta$f1), (f0±$\Delta$f2), (f0±$\Delta$f3), and (f0±$\Delta$f4).

Similarly, in the training mode, the wireless receiver 30A makes switching for a filtering operation to cause the variable band-pass filter 35A to allow signals of $\Delta$f1, $\Delta$f2, $\Delta$f3, and $\Delta$f4 in this order to pass therethrough for every time 4T. In other words, the receiving frequency of the wireless receiver 30A is switched. By the mode switching in this way, training is performed to get an optimum combination of an oscillation frequency of the wireless transmitter 10 and a receiving frequency of the wireless receiver 30A.

FIG. 3E depicts a detailed sequence of the communication mode of the wireless transmitter 10. FIG. 3F depicts a detailed sequence of the communication mode of the wireless receiver 30A. The abscissas of FIGS. 3E and 3F represent time t which is common to the transmitter and the receiver.

In the communication mode, information is transmitted and received between the wireless transmitter 10 and the wireless receiver 30A, using an optimum oscillation frequency $\Delta$fi and an optimum receiving frequency $\Delta$fi.

The ordinate of FIG. 3G represents the power spectrum of transmission signals of the wireless transmitter 10. The ordinate of FIG. 3H represents the power spectrum of output signals of the variable band-pass filter (BPS) 35A of the wireless receiver 30A. The abscissa of FIGS. 3G and 3H represents frequency.

FIG. 3G presents that wireless transmitter 10 outputs a transmission signal having a peak at a frequency of (f0+Δfi) and a transmission signal having a peak at a frequency of (f0−Δfi).

FIG. 3H presents that the variable band-pass filter (BPS) 35A of the wireless receiver 30A outputs a signal having a peak at a frequency Δfi that is a difference between the peaks of the two transmission signals in consequence of product detection and band-pass filtering.

Figure 4:
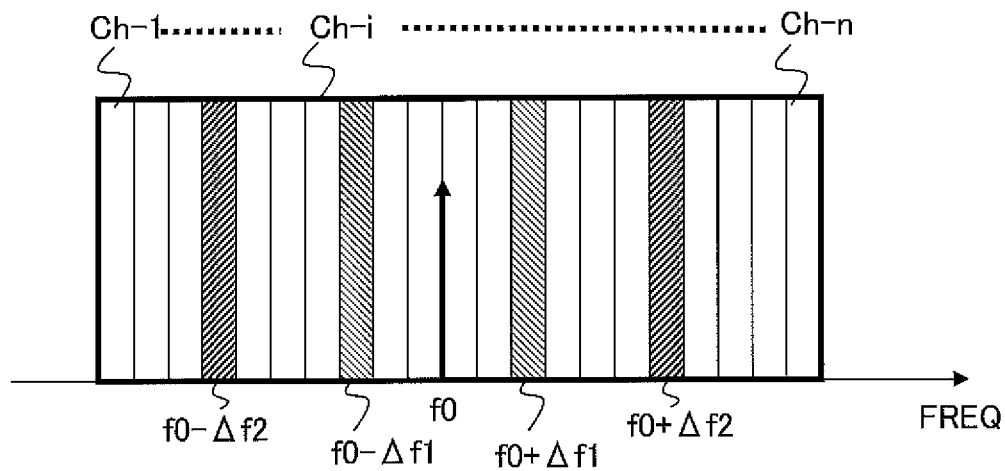
FIG. 4 is a diagram depicting an example (first example) of channels for the wireless communication system according to the second embodiment.

FIG. 4 is a diagram depicting an example (first) of channels for the wireless communication system according to the second embodiment. The abscissa represents frequency and rectangles denote respective radio communication channels Ch-1 to Ch-n (n is a natural number).

Light gray rectangles denote a combination of a carrier frequency (f0−Δf1) of a first transmission wave and a carrier frequency (f0+Δf1) of a second transmission wave. Frequency f0 denotes an average frequency between the carrier frequency (f0−Δf1) of the first transmission wave and the carrier frequency (f0+Δf1) of the second transmission wave.

Dark gray rectangles denote a combination of a carrier frequency (f0−Δf2) of the first transmission wave and a carrier frequency (f0+Δf2) of the second transmission wave. Frequency f0 denotes, as described above, an average frequency between the carrier frequency (f0−Δf2) of the first transmission wave and the carrier frequency (f0+Δf2) of the second transmission wave.

The wireless communication system of the present embodiment divides a frequency band to be used into radio communication channels Ch-1 to Ch-n which are a plurality of narrow frequency bands. In the radio communication channels Ch-1 to Ch-n, signal modulation is performed in the same method as in the first embodiment. Within the frequency band to be used, one center frequency (average frequency) f0 is set, two channels having an equal frequency interval to right and left from the frequency f0 on the frequency axis are selected and modulated with a same signal, and the modulated signals are radiated into air from the transmitting antennas 20-1, 20-2. The present embodiment can be applied to existing wireless communication systems that implement frequency division multiplexing in a manner compliant with radio law.

Figure 5:
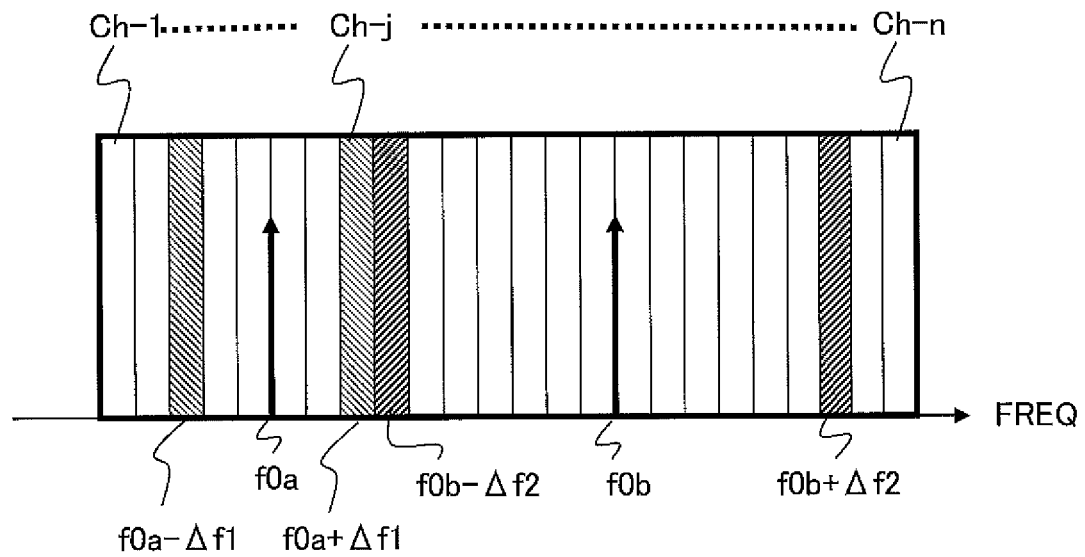
FIG. 5 is a diagram depicting an example (second example) of channels for the wireless communication system according to the second embodiment.

FIG. 5 is a diagram depicting an example (second) of channels for the wireless communication system according to the second embodiment.

A difference from FIG. 4 lies in that different center frequencies f0a and f0b are set within the frequency band. The wireless communication system in the present embodiment further uses a communication channel with a frequency (f0a+Δf1) and a communication channel with a frequency (f0a−Δf1) which are positioned at an equidistant interval from the center frequency f0a on the frequency axis. At the same time, the system uses a communication channel with a frequency (f0b+Δf1) and a communication channel with a frequency (f0b−Δf1) which are positioned at an equidistant interval from the center frequency f0b on the frequency axis. In this way, instead of using a single channel at the same time, by selecting two communication channels respectively which are positioned at equidistant intervals from the plural center frequencies f0a and f0b on the frequency axis, providing a plurality of radio channels at the same time can be implemented and this is effective for increasing information communication capacity and improving the reliability of radio communication channels.

Advantageous Effects of Second Embodiment

The second embodiment described above has the following advantageous effects (C) and (D).

(C) The wireless communication system of the present embodiment can be applied to existing wireless communication systems that implement frequency division multiplexing in a manner compliant with radio law.

(D) Instead of using a single channel at the same time, by selecting two communication channels respectively which are positioned at equidistant intervals from the plural center frequencies f0a and f0b on the frequency axis, providing a plurality of radio channels at the same time can be implemented and this is effective for increasing information communication capacity and improving the reliability of radio communication channels.

Configuration of Third Embodiment

Figure 6A:
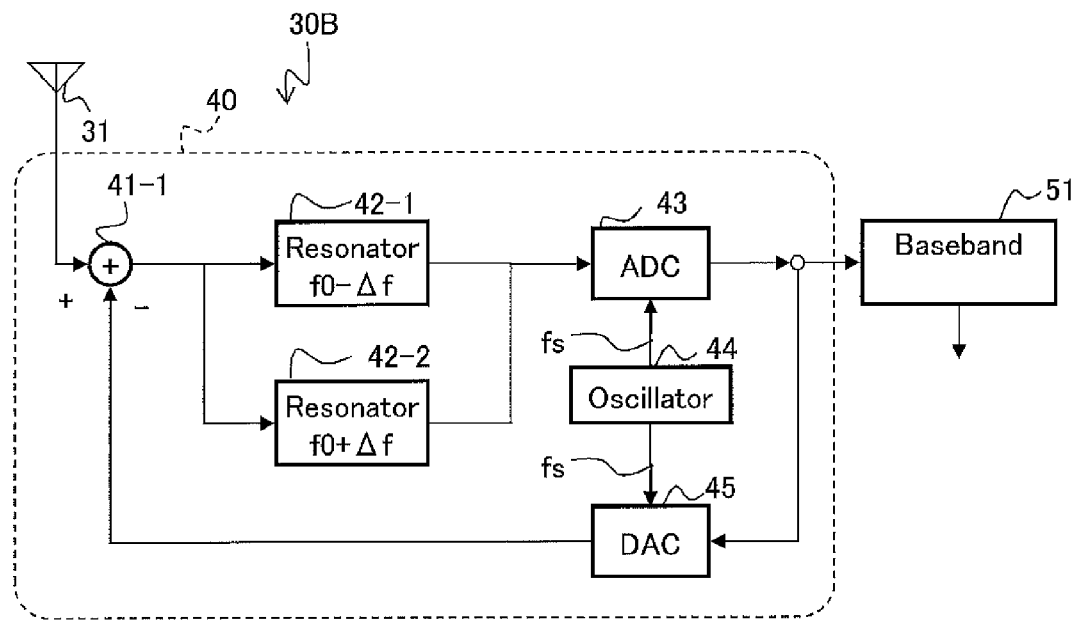
FIGS. 6A and 6B are diagrams depicting a configuration of a wireless receiver according to a third embodiment.
Figure 6B:
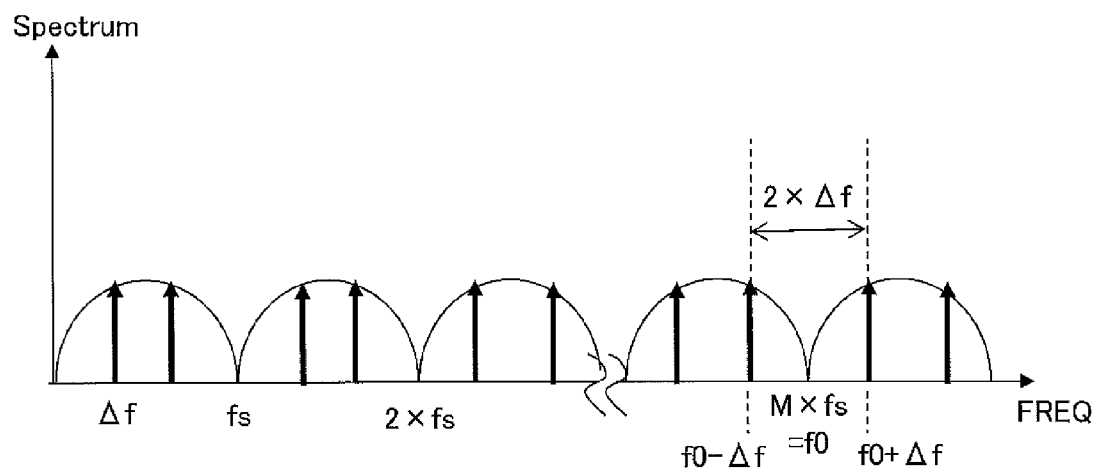

FIGS. 6A and 6B are diagrams depicting a configuration of a wireless receiver according to a third embodiment. Components corresponding to those of the wireless receiver 30 of the first embodiment depicted in FIG. 1B are assigned the same reference numerals.

A wireless receiver 30B of the present embodiment depicted in FIG. 6A has the same configuration as the wireless receiver 30 of the first embodiment with the exception that there is a connection from the receiving antenna 31 to the baseband circuit 51 via a delta-sigma modulator 40, which is a difference from the wireless receiver 30 of the first embodiment.

The delta-sigma modulator 40 provided in the wireless receiver 30B of the present embodiment includes resonators 42-1, 42-2, an analog-digital converter 43, a digital-analog converter 45, an oscillator 44, and an anti-phase signal combiner 41-1. A resonator 42-1 which is a first resonator resonates at a resonant frequency that corresponds to a carrier frequency (f0−Δf) of a transmission wave. A resonator 42-1 which is a second resonator resonates at a resonant frequency that corresponds to a carrier frequency (f0+Δf) of a transmission wave.

The analog-digital converter 43, for example, compares an input signal with a predetermined threshold value and converts the input signal to a 1-bit digital signal. The oscillator 44 outputs an oscillation signal with a frequency fs. The digital-analog converter 45, for example, converts a 1-bit digital signal to a predetermined analog value correspondingly.

FIG. 6B is a diagram depicting the power spectrum of the delta-sigma modulator 40 in the wireless receiver 30B of the present embodiment. The abscissa represents frequency and the ordinate represents the spectral density (spectrum) of output signals of the delta-sigma modulator 40.

Due to an aliasing signal which is specific to digital signals, the power spectrum of output signals of the delta-sigma modulator 40 which is a band-pass type becomes 0 at every integral multiple of a sampling frequency fs. In a frequency range below the sampling frequency fs, there is a peak of a zero-order harmonic. In a frequency range from sampling frequency fs to 2fs, there is a peak of a first-order harmonic. In turn, in a frequency range from sampling frequency (n×fs) to ((n+1)×fs) (n is a natural number), there is a peak of an n-th order harmonic.

Operation of Third Embodiment

Operation of the wireless receiver 30B is described, based on FIG. 6A.

The digital-analog converter 45 outputs a feedback signal to the anti-phase signal combiner 41-1. By the anti-phase signal combiner 41-1, the feedback signal is subtracted from a received signal that is output by the receiving antenna 31. Output signals of the anti-phase signal combiner 41-1 are resonated via the resonators 42-1, 42-2 connected in parallel at their resonance frequencies. Thereby, noise caused by frequencies higher than the frequency f0 can be eliminated.

Output signals of the resonators 42-1, 42-2 are input to the analog-digital converter 43 and converted to a digital signal. The digital signal is output to the baseband circuit 51 and also output to the digital-analog converter 45 in which it is converted to the above feedback signal. The analog-digital converter 43 and the digital-analog converter 45 are sampled at the same sampling frequency fs provided by the oscillator 44 which is common to them. This sampling frequency fs is an integral multiple of an average frequency f0 between the carrier frequency (f0−Δf) and carrier frequency (f0+Δf) of two transmission waves mentioned above and fulfills the following Equation 1.

$$f0 = M \times fs \quad \text{(Equation 1)}$$

This delta-sigma modulator 40 outputs digital signals such that the density in time of "1" bits increases in proportion to a differential value (variation) of input signals.

In the present embodiment, because the center frequency f0 of the carriers of received signals is M multiples of the sampling frequency fs, as depicted in FIG. 6B, from the delta-sigma modulator 40, the output components of a transmission wave signal having the carrier frequency (f0−Δf) and a transmission wave signal having the carrier frequency (f0+Δf) are output as digital signals.

Advantageous Effect of Third Embodiment

The third embodiment described above has the following advantageous effect (E).

(E) According to the delta-sigma modulator 40 of the present embodiment, modulated signal waves whose center frequency is sufficiently lower than transmission waves can be derived as digital signals without using the mixer 32 and the oscillator 33 which are analog nonlinear circuits. Accordingly, it is possible to pick up a time point at which reflected waves of the co-phase are combined at the receiving point with ease through digital signal processing that is performed by the baseband circuit 51 in the subsequent stage and it can be implemented to simplify the wireless receiver 30B and enhance reliability.

Configuration of Fourth Embodiment

Figure 7A:
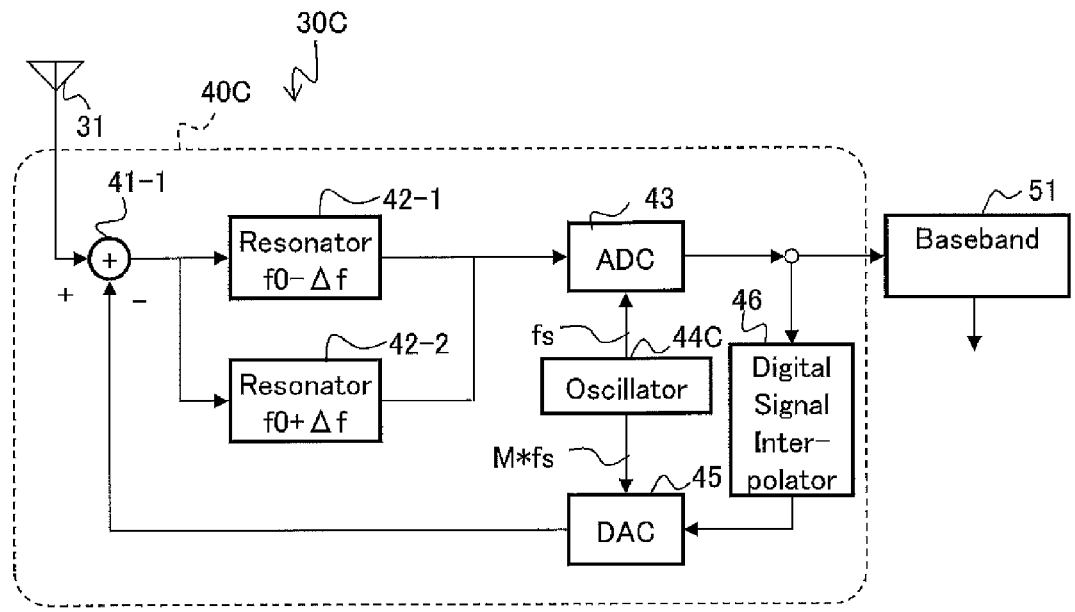
FIGS. 7A and 7B are diagrams depicting a configuration of a wireless receiver according to a fourth embodiment.
Figure 7B:
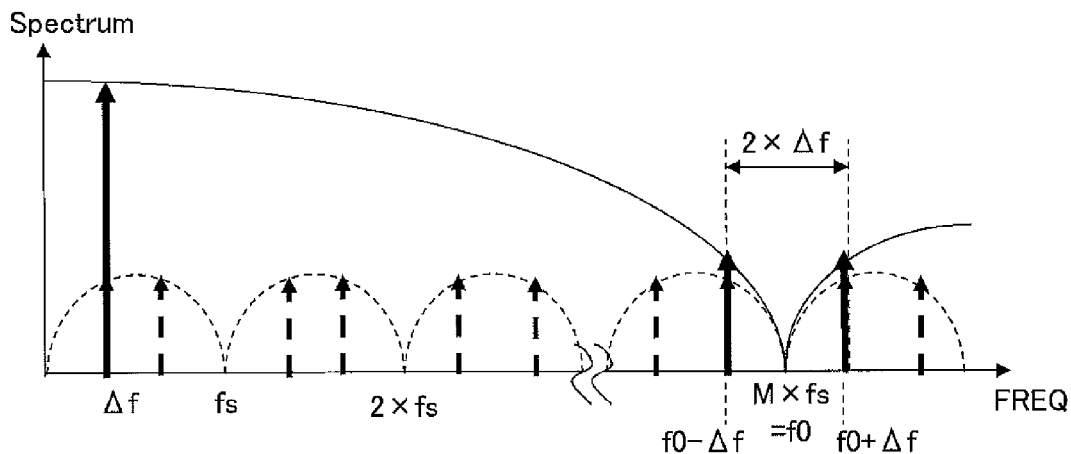

FIGS. 7A and 7B are diagrams depicting a configuration of a wireless receiver according to a fourth embodiment. Components corresponding to those of the wireless receiver of the third embodiment depicted in FIG. 6A are assigned the same reference numerals.

A wireless receiver 30C of the present embodiment has the same configuration as the wireless receiver 30B of the third embodiment with the exception that the wireless receiver 30C includes a delta-sigma modulator 40C which differs from the delta-sigma modulator 40 included in the wireless receiver 30 of the third embodiment.

The delta-sigma modulator 40C of the present embodiment has the same configuration of the delta-sigma modulator 40B of the third embodiment with the exception that it includes a digital signal interpolator 46 in addition to the delta-sigma modulator 40 of the third embodiment and an oscillator 44C outputs an oscillation signal with a sampling frequency of (M×fs) to the digital-analog converter 45.

This digital signal interpolator 46 inputs a 1-bit signal at a given period and outputs a signal at a specified sampling period. The digital signal interpolator 46, for example, outputs an input digital signal as is at timing that coincides with the given period and interpolates and outputs "0" at timing that does not coincide with the given period.

The delta-sigma modulator 40C of the present embodiment inputs an output signal of the analog-digital converter 43 to the digital-analog converter 45 via the digital signal interpolator 46.

FIG. 7B is a diagram depicting operation of the wireless receiver 30C of the present embodiment. The abscissa represents frequency and the ordinate represents power spectrum. A solid line represents the power spectrum of output signals of the delta-sigma modulator 40C and, additionally, the power spectrum of output signals of the delta-sigma modulator 40 depicted in FIG. 6B, which has been described previously, is represented by a dotted line for comparison purposes.

Due to an aliasing signal which is specific to digital signals, the power spectrum of output signals of the delta-sigma modulator 40C becomes 0 at every integral multiple of a sampling frequency (M×fs) of the digital-analog converter 45. In a frequency range below the sampling frequency (M×fs), there is a peak of a zero-order harmonic.

Operation of Fourth Embodiment

The wireless receiver 30C of the fourth embodiment depicted in FIG. 7A differs from the wireless receiver 30B of the third embodiment depicted in FIG. 6A in the following respect: the sampling frequency fs of the digital-analog converter 45 used by the delta-sigma modulator 40C is set to be an integral multiple of the sampling frequency (M×fs) of the analog-digital converter 43 and, when a digital output of the analog-digital converter 43 is returned to a feedback loop, the frequency of the digital signal is multiplied by an integer by the digital signal interpolator 46.

The digital-analog converter 45 exhibits a low-pass attenuation characteristic of a SINC function because of a zero-order hold effect. As the difference between the average frequency of the carrier frequencies of two transmission waves and the sampling frequency of a clock generator circuit becomes larger, the gain of the feedback loop with respect to the transmit frequencies decreases.

In the present embodiment, because the center frequency f0 of the carriers of received signals occurs at M multiples of the sampling frequency fs, as depicted in FIG. 7B, from the delta-sigma modulator 40C, the output components of a transmission wave signal having the frequency Δf, a transmission wave signal having the carrier frequency (f0−Δf), and a transmission wave signal having the carrier frequency (f0+Δf) are output as digital signals.

Because of the zero-order hold effect, a signal with the frequency Δf has the largest spectral density. Thus, information signals carried by the signal with the frequency Δf can be picked up with ease.

Advantageous Effect of Fourth Embodiment

The fourth embodiment described above has the following advantageous effect (F).

(F) According to the present embodiment, the frequency of digital signals to be input to the digital-analog converter 45 in the feedback loop can be raised in advance in a low frequency range, it is possible to suppress a decrease in the feedback gain with respect to the transmission waves due to the zero-order hold effect. Accordingly, in comparison with the delta-sigma modulator 40 of the third embodiment depicted in FIG. 6A, the sampling frequency fs can be set lower and low-cost hardware and low power consumption can be achieved.

Configuration of Fifth Embodiment

Figure 8A:
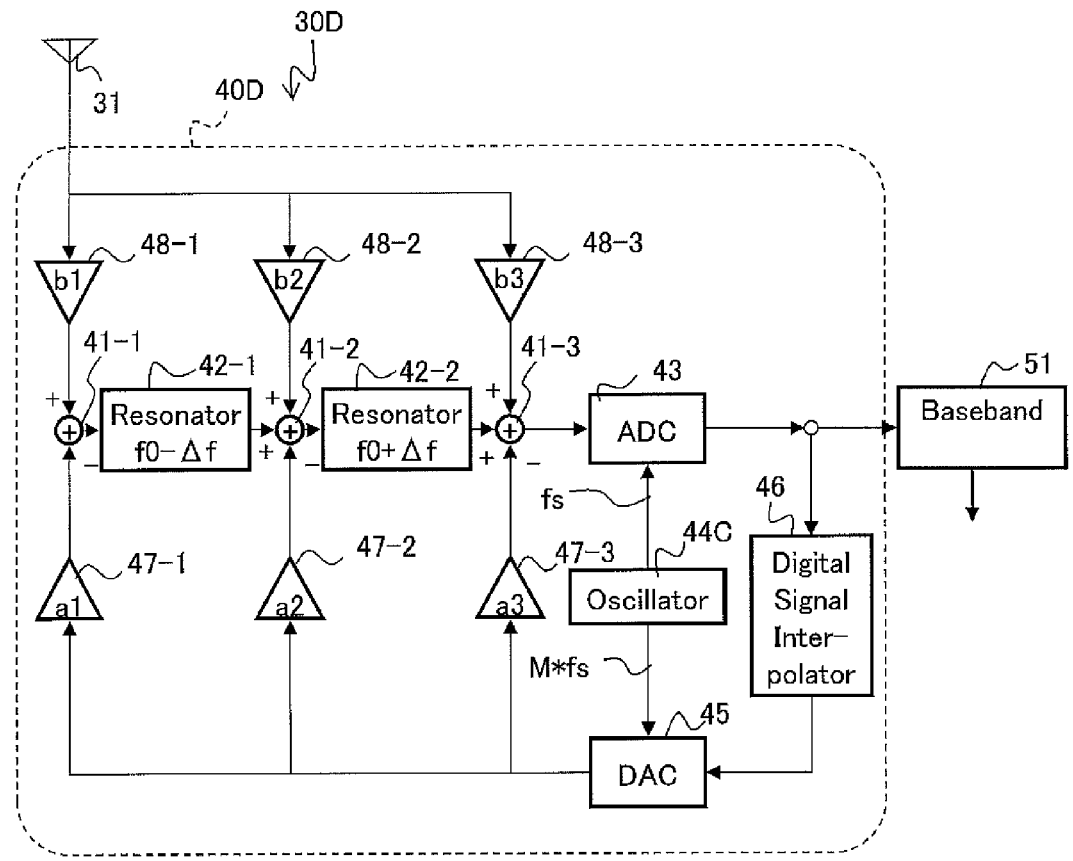
FIGS. 8A and 8B are diagrams depicting a configuration of a wireless receiver according to a fifth embodiment.

FIG. 8A is a diagram depicting a configuration of a wireless receiver according to a fifth embodiment. Components corresponding to those of the wireless receiver of the fourth embodiment depicted in FIG. 7A are assigned the same reference numerals.

As depicted in FIG. 8A, a wireless receiver 30D of the present embodiment includes a delta-sigma modulator 40D which differs from that in the wireless receiver 30C of the fourth embodiment depicted in FIG. 7A.

The delta-sigma modulator 40D of the present embodiment includes forward amplifiers 48-1, 48-2, 48-3, backward amplifiers 47-1, 47-2, 47-3, and anti-phase signal combiners 41-2, 41-3 in addition to the delta-sigma modulator 40C of the fourth embodiment.

The output line of the receiving antenna 31 is connected to the forward amplifiers 48-1, 48-2, 48-3.

The output line of the digital-analog converter 45 is connected to the backward amplifiers 47-1, 47-2, 47-3.

The output line of a forward amplifier 48-1 is connected to a co-phase input node of an anti-phase signal combiner 41-1. The output line of a backward amplifier 47-1 is connected to an anti-phase input node of the anti-phase signal combiner 41-1.

An anti-phase signal combiner 41-2 is connected between a resonator 42-1 and a resonator 42-2. The output side of the resonator 42-1 and the output side of a forward amplifier 48-1 are connected to co-phase input nodes of the anti-phase signal combiner 41-2. The output side of a backward amplifier 47-2 is connected to an anti-phase input node of the anti-phase signal combiner 41-2.

An anti-phase signal combiner 41-3 is connected between the resonator 42-2 and the analog-digital converter 43. The output line of the resonator 42-2 and the output line of a forward amplifier 48-3 are connected to a co-phase input nodes of the anti-phase signal combiner 41-3. The output line of a backward amplifier 47-3 is connected to an anti-phase input node of the anti-phase signal combiner 41-3.

As described previously, received signals are input to the co-phase input nodes of the anti-phase signal combiners 41-1, 41-2, 41-3 via the forward amplifiers 48-1, 48-2, 48-3. A feedback output of the digital-analog converter 45 is applied to the anti-phase input nodes of the anti-phase signal combiners 41-1, 41-2, 41-3 via the backward amplifier 47-1, 47-2, 47-3.

Third-order feed-forward control is implemented by the forward amplifiers 48-1, 48-2, 48-3 and third-order feedback control is implemented by the backward amplifiers 47-1, 47-2, 47-3. Thus, a signal transfer function of the delta-sigma modulator 40D is represented by a sixth-order function.

Figure 8B:
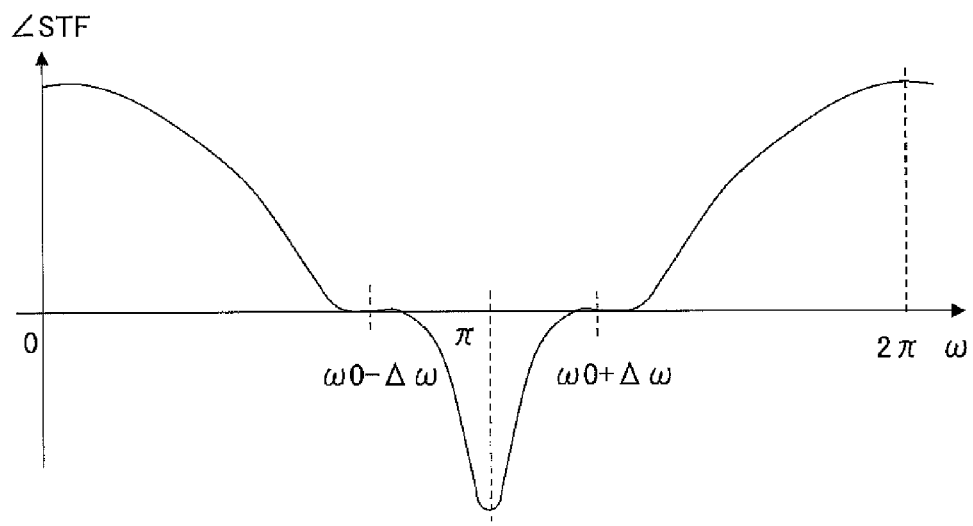

FIG. 8B is a diagram depicting the configuration and operation of the wireless receiver 30D according to the fifth embodiment and presents a phase characteristic of the signal transfer function of the delta-sigma modulator 40D. The abscissa represents phase ω and the ordinate represents an example of phase distortion of the STF (signal transfer function).

The phase distortion of the signal transfer function STF is a given positive value when the phase ω is 0. It becomes substantially 0 when the phase is (ω0−Δω) and then monotonically decreases until the phase comes at a point of π. After the phase goes over the point of π, the phase distortion of the signal transfer function STF increases and becomes substantially 0 again when the phase is (ω0+Δω). In terms of frequency, the frequency (f0−Δf) corresponds to the phase (ω0−Δω) and the frequency (f0+Δf) corresponds to the phase (ω0+Δω).

Figure 9:
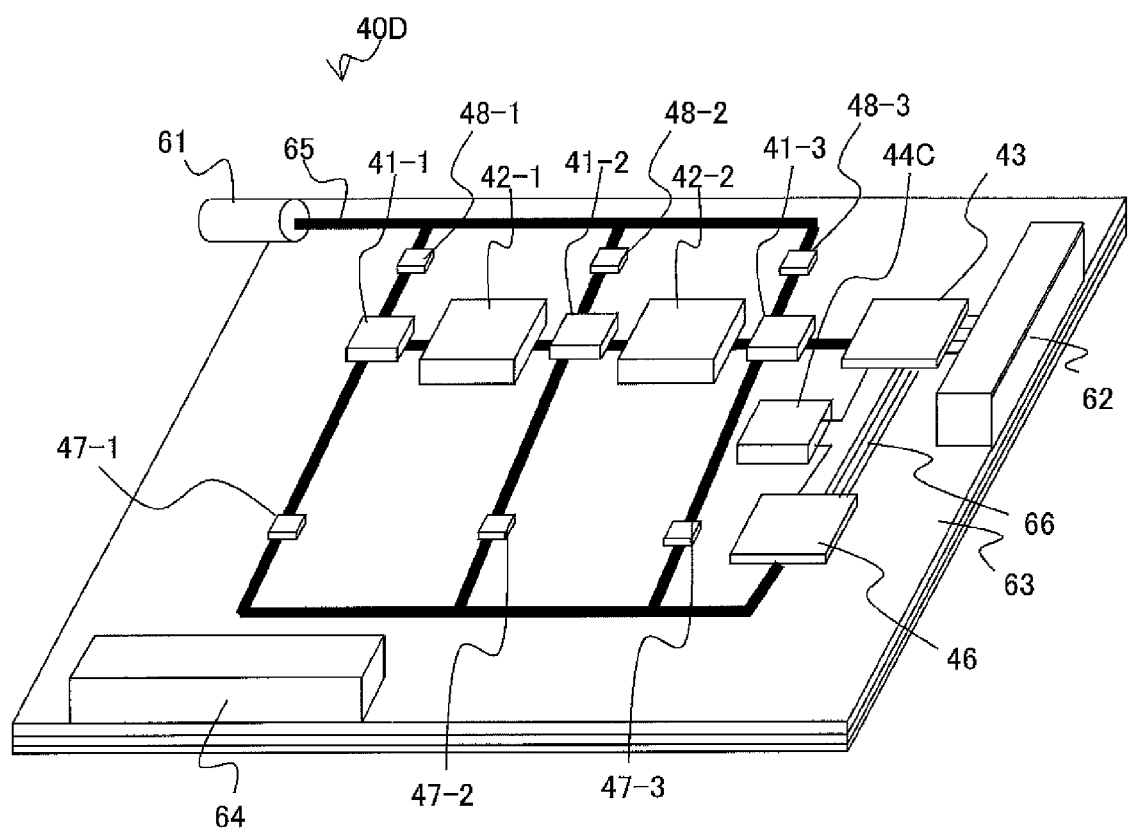
FIG. 9 is a diagram depicting an example of implementation of the wireless receiver according to the fifth embodiment.

FIG. 9 is a diagram depicting an example of implementation of the wireless receiver according to the fifth embodiment.

On a multi-layer PC board 63, a power supply circuit 64, a radio-frequency connector 61, and a digital signal connector 62 are mounted and functional element blocks assigned the same reference numerals as in FIG. 8 are electrically interconnected by analog signal lines 65 and digital signal lines 66. DC current generated by the power supply circuit 64 is supplied to the active elements of the functional element blocks by power supply lines, which are not depicted, provided in an inner layer of the multi-layer PC board 63 and by using through holes or the like. In an inner layer of the multi-layer PC board 63, there is formed a ground plane, which is not depicted, for the analog signal lines 65 and digital signal lines 66. Strip lines are formed by this ground plane and these signal lines and thus signal transfer lines are formed.

On the wireless receiver 30D of the multi-layer PC board 63, the radio frequency connector 61 as an input terminal for received waves and the digital signal connector 62 as an output terminal for digital signals are mounted. The delta-sigma modulator 40D depicted in FIG. 8A is made up in this way. This delta-sigma modulator 40D can be mass-produced through the use of a PC board process and a process of surface mounting of parts and this is effective for production cost reduction.

Operation of Fifth Embodiment

If signals generated by a signal generator are modulated using phase information, two carriers are modulated in anti-phase. When signals having two carrier frequencies respectively are converted to a signal having a differential frequency between the two carrier frequencies, it is desirable that the delta-sigma modulator 40D does not distort the phases of the two carrier frequencies.

The wireless receiver 30D of the present embodiment is able to make the phase distortion of the signal transfer function STF of the delta-sigma modulator 40D zeroed at the respective carrier frequencies (f0+Δf) and (f0−Δf) of two transmission waves. Thus, it is possible to improve the phase modulation sensitivity of the wireless receiver 30D.

Advantageous Effect of Fifth Embodiment

The fifth embodiment described above has the following advantageous effect (G).

(G) According to the delta-sigma modulator 40D of the present embodiment, the phase distortion is suppressed to be negligible at the respective carrier frequencies (f0+Δf) and (f0−Δf) of two transmission waves and, therefore, it is possible to improve the phase modulation sensitivity of the wireless receiver 30D.

Configuration of Sixth Embodiment

Figure 10A:
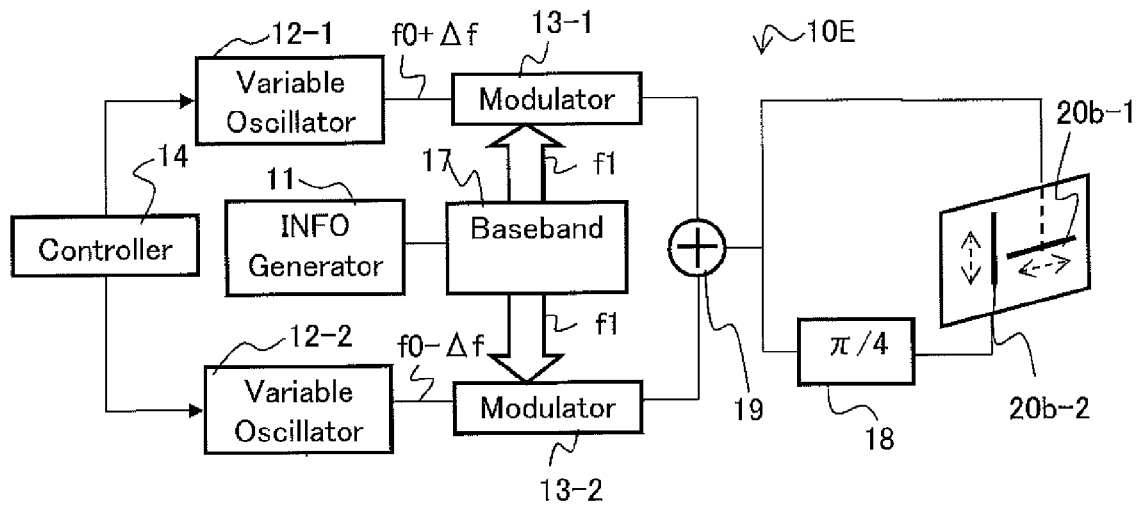
FIGS. 10A and 10B are diagrams depicting a configuration of a wireless communication system according to a sixth embodiment.
Figure 10B:
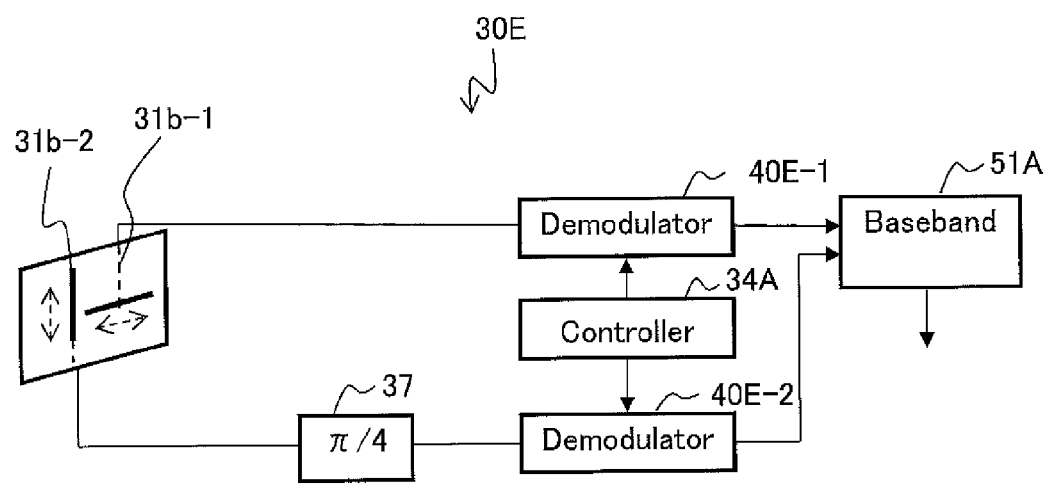

FIGS. 10A and 10B are diagrams depicting a configuration of a wireless communication system according to a sixth embodiment. Components corresponding to those in the wireless communication system depicted in FIGS. 2A and 2B are assigned the same reference numerals.

FIG. 10A is a diagram depicting a configuration of a wireless transmitter according to the sixth embodiment.

The wireless transmitter 10E of the present embodiment includes a combiner-distributor 19, a phase shifter 18, and transmitting antennas 20b-1, 20b-2 for linearly polarized waves orthogonal to each other in addition to the wireless transmitter 10 of the second embodiment.

The combiner-distributor 19 combines two input signals and distributes combined signals to two output lines. The phase shifter 18 is, for example, a delay line and it delays a signal input to it by time equivalent to one-fourth wavelength of the carrier frequency f0 and outputs it.

The output lines of modulators 13-1, 13-2 are input to the combiner-distributor 19. One output line of the combiner-distributor 19 is connected to a transmitting antenna 20b-1 and its other output line is connected to a transmitting antenna 20b-2 via the phase shifter 18.

FIG. 10B is a diagram depicting a configuration of a wireless receiver according to the sixth embodiment.

The wireless receiver 30E of the present embodiment includes receiving antennas 31b-1, 31b-2 for linearly polarized waves orthogonal to each other, a phase shifter 37, demodulators 40E-1, 40E-2, an receiving controller (controller-R) 34A, and a baseband circuit 51A.

The phase shifter 37 delays a signal input thereto by time equivalent to one-fourth wavelength of the carrier frequency f0 for an output. The demodulators 40E-1, 40E-2 demodulate a signal input thereto with a predetermined carrier frequency. The baseband circuit 51A generates an information signal based on two demodulated signals.

Operation of Sixth Embodiment

A description of a part of operation of the wireless communication system of the sixth embodiment in FIGS. 10A and 10B, which is the same as the operation of the wireless communication system of the second embodiment depicted in FIGS. 2A and 2B, is omitted.

Unlike the second embodiment, in the wireless transmitter 10E, an output signal of the modulator 13-1 and an output signal of the modulator 13-2 are combined by the combiner-distributor 19 and the combined signals are distributed into two signals. One of these signals is given a phase difference of 90° relative to the frequency f0 by the phase shifter 18. Then, these signals are transmitted into air via the transmitting antennas 20b-1, 20b-2 assembled into an integral antenna to transmit two beams of linearly polarized waves orthogonal to each other.

Unlike the second embodiment, in the wireless receiver 30E, received waves taken in from the receiving antenna 31b-1 are demodulate by the demodulator 40E-1 and supplied to the baseband circuit 51A. Received waves taken in from the receiving antenna 31b-2 are given a phase difference of 90° relative to the frequency f0 by the phase shifter 37, demodulated by the demodulator 40E-2, and supplied to the baseband circuit 51A.

According to the present embodiment, linearly polarized waves orthogonal to each other are transmitted into air from the transmitting antennas 20b-1, 20b-2 assembled into an integral antenna to transmit the waves. Thus, it is possible to radiate transmission waves in which the polarization vector rotates with a frequency that is equivalent to a difference between the frequencies of two carriers and a rotation angle of the polarization vector of the transmission waves can be detected by the receiver. Accordingly, in comparison with the wireless communication system of the second embodiment, by providing an integral antenna assembly of the transmitting antennas 20b-1, 20b-2 and of the receiving antennas 31b-1, 31b-2, respectively, downsizing is feasible.

Advantageous Effect of Sixth Embodiment

The sixth embodiment described above has the following advantageous effect (H).

(H) In comparison with the wireless communication system of the second embodiment, by providing an integral antenna assembly of the transmitting antennas 20b-1, 20b-2 and of the receiving antennas 31b-1, 31b-2, respectively, downsizing is feasible.

Configuration of Seventh Embodiment

Figure 11A:
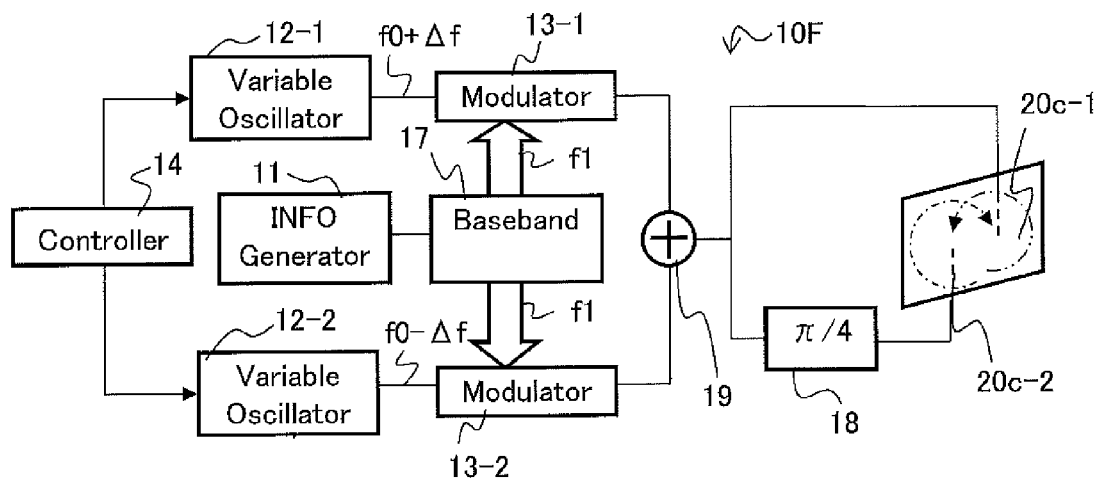
FIGS. 11A and 11B are diagrams depicting a configuration of a wireless communication system according to a seventh embodiment.
Figure 11B:
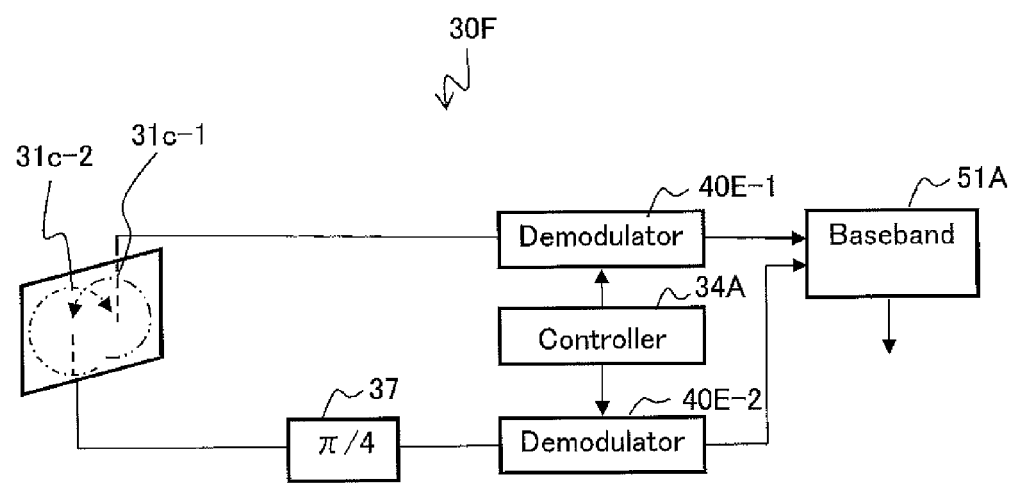

FIGS. 11A and 11B are diagrams depicting a configuration of a wireless communication system according to a seventh embodiment. Components corresponding to those in the wireless communication system of the sixth embodiment depicted in FIGS. 10A and 10B are assigned the same reference numerals.

A wireless transmitter 10F depicted in FIG. 11A has the same configuration as the wireless transmitter 10E of the sixth embodiment with the exception that the wireless transmitter 10F includes transmitting antennas 20c-1, 20c-2 assembled into an integral antenna to transmit circularly polarized waves, which is a difference from the wireless transmitter 10E of the sixth embodiment.

A wireless receiver 30F depicted in FIG. 11B has the same configuration as the wireless receiver 30E of the sixth embodiment with the exception that it includes receiving antennas 31c-1, 31c-2 assembled into an integral antenna to receive circularly polarized waves, which is a difference from the wireless receiver 30E of the sixth embodiment.

Manufacture of Seventh Embodiment

When manufacturing an antenna for two beams of linearly polarized waves orthogonal to each other like the transmitting antennas 20b-1, 20b-2 and the receiving antennas 31b-1, 31-b2 of the sixth embodiment, it is necessary to physically realize linear conductors that are positioned to be exactly orthogonal to each other. In manufacturing such an linearly polarized antenna, it is practically difficult to maintain the accuracy of positioning the linear conductors so as to be exactly orthogonal to each other.

In the present embodiment, the transmitting antennas 20c-1, 20c-2 and the receiving antennas 31c-1, 31c-2 are antennas for circularly polarized waves with different rotation directions. Such antennas can be manufactured by simply sticking two antennas together; one for clockwise rotating circularly polarized waves and the other for counterclockwise rotating circularly polarized waves. The accuracy of positioning two antennas in relative positions may not need to be taken into consideration. Thus, it is possible to manufacture these antennas at low cost, since the accuracy of sticking the antennas may not need to be taken into consideration in a mass-production process.

Advantageous Effect of Seventh Embodiment

The seventh embodiment described above has the following advantageous effect (I).

(I) In the mass-production process of the transmitting antennas and the receiving antennas, it is possible to manufacture the antennas at low cost, since the accuracy of sticking the antennas may not need to be taken into consideration.

Configuration of Eighth Embodiment

Figure 12:
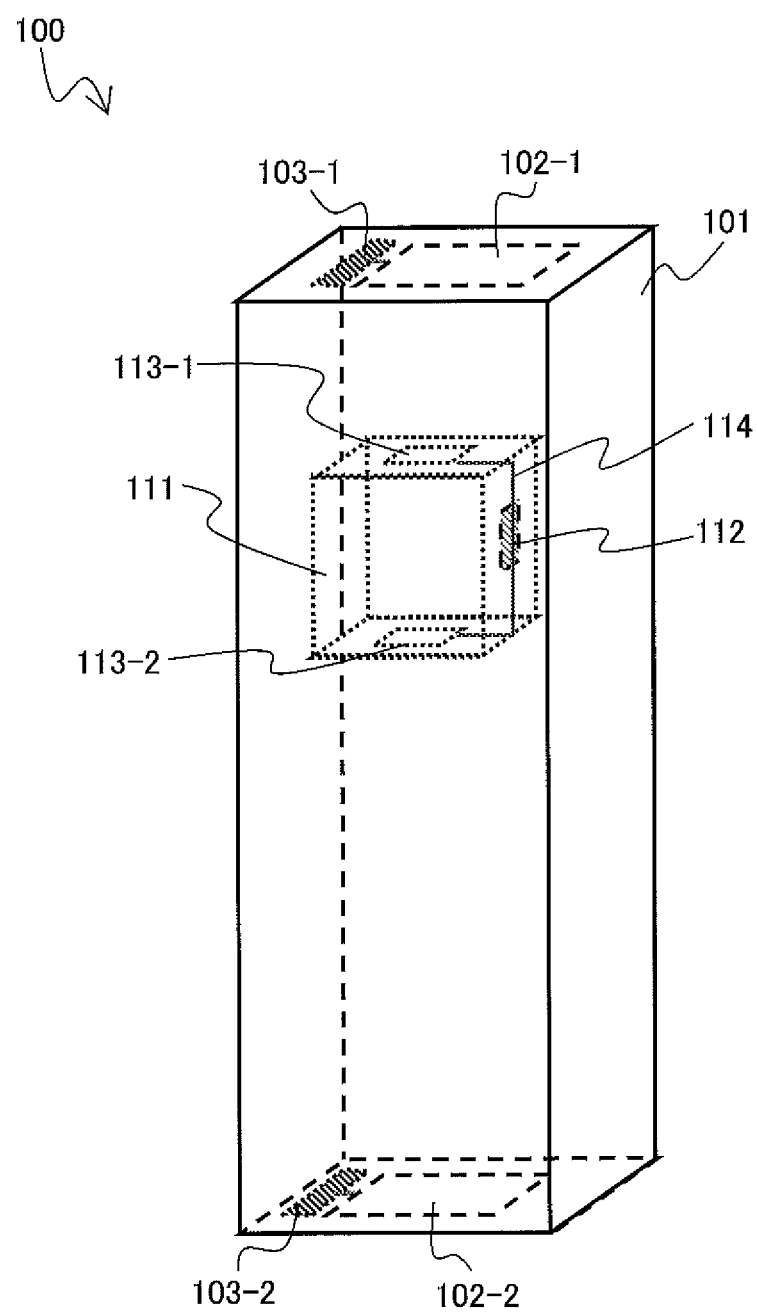
FIG. 12 is a diagram of a configuration of an elevator system according to an eighth embodiment.

FIG. 12 is a diagram depicting a configuration of an elevator system according to an eighth embodiment.

This elevator system 100 includes a building 101 that is a vertically long cuboid and an elevator car 111. Inside the building 101, there is provided a space in which elevator car 111 goes up and down. The elevator car 111 goes up and down in the internal space of the building 101 by ropes and a drive mechanism which are not depicted.

A base station radio device 102-1 and an antenna 103-1 are installed on the ceiling of the internal space of the building 101 and a base station radio device 102-2 and an antenna 103-2 are installed on the bottom of the internal space of the building 101. The base station radio devices 102-1, 102-2 are radio devices having the same configuration as the wireless receiver 30F depicted in FIG. 11B. The antennas 103-1, 103-2 are integral receiving antennas like the receiving antennas 31c-1, 31c-2 depicted in FIG. 11B.

An antenna 113-1 is installed on the top surface of the elevator car 111 and an antenna 113-2 is installed on the bottom surface thereof and these antennas are connected to a terminal station radio device 112 by a radio-frequency (RF)

cable 114. The terminal station radio device 112 is a radio device like the wireless transmitter 10F depicted in FIG. 11A. These antennas 113-1, 113-2 are integral transmitting antennas like the transmitting antennas 20c-1, 20c-2 depicted in FIG. 11A.

Operation of Eighth Embodiment

Radio waves transmitted from the terminal station radio device 112 are transmitted via the antennas 113-1 and 113-2. As transmitted radio waves travel through the internal space of the building 101, regarded as a radio transmission medium, they experience multiple reflections by inside walls of the building 101 and outside walls of the elevator car 111. That is, the internal space of the building 101 forms a multi-path interference environment. The radio waves that experienced multiple reflections arrive at the antennas 103-1, 103-2, respectively.

In the present embodiment, high-quality radio transmission can be implemented even under the multi-path interference environment. Because control/supervision of the elevator car 111 can be implemented by wireless connection means from the building 101, it is avoided that the space in which the elevator car 111 goes up and down is wasted by wired connection means such as cables. Thus, it is possible to enhance the carrying capacity by decreasing the volume of the building 101 or increasing the dimensions of the elevator car 111, while keeping the volume of the building 101 unchanged.

In addition, the weight of the elevator car 111 can be reduced. This is because the weight or wired connection means such as cables to be connected to the elevator car 111 accounts for a considerable amount of weight in a high-rise building.

Advantageous Effect of Eighth Embodiment

The eighth embodiment described above has the following advantageous effect (J).

(J) Because control/supervision of the elevator car 111 can be implemented by wireless connection means from the building 101, it is avoided that the space in which the elevator car 111 goes up and down is wasted by wired connection means such as cables. Thus, it is possible to enhance the carrying capacity by decreasing the volume of the building 101 or increasing the dimensions of the elevator car 111, while keeping the volume of the building 101 unchanged.

Configuration of Ninth Embodiment

Figure 13:
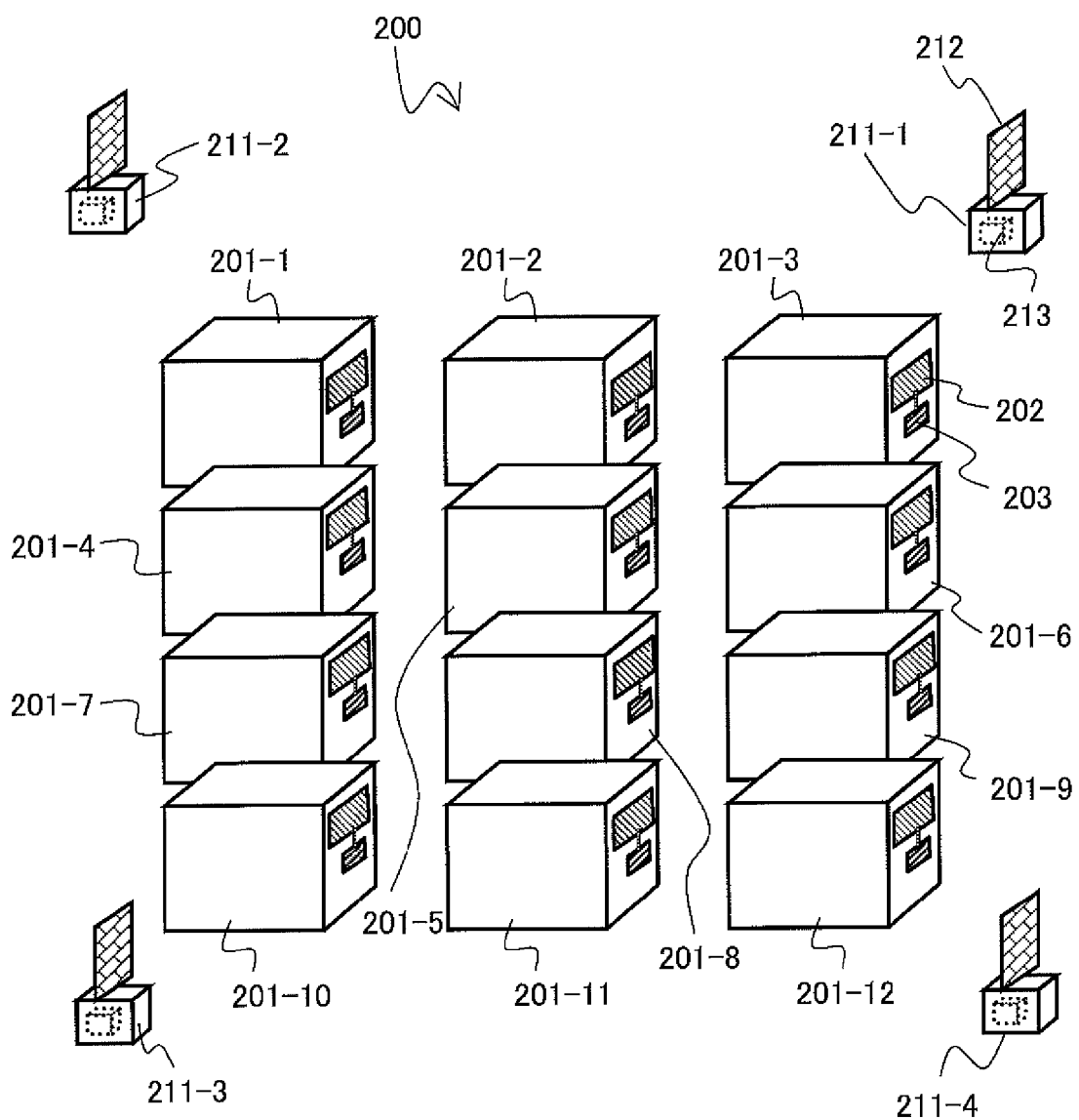
FIG. 13 is a diagram depicting a configuration of a transformer equipment control system according to a ninth embodiment.

FIG. 13 is a diagram depicting a configuration of an transformer equipment control system according to a ninth embodiment.

The transformer equipment control system 200 of the present embodiment includes a plurality of power transformers 201-1 to 201-12 and a plurality of radio base stations 211-1 to 211-4 which are set up in the vicinity of the power transformers. In the present embodiment, the number of the power transformers 201-1 to 201-12 is larger than the number of the radio base stations 211-1 to 211-4.

Each of the power transformers 202-1 to 202-12 includes a terminal station radio device 203 and an integral antenna for orthogonally polarized waves 202. The size of the power transformers 201-1 to 201-12 is on the order of several meters.

Each of the radio base stations 211-1 to 211-4 includes a base station radio device 213 and an integral antenna for orthogonally polarized waves 212. The size of the power transformers 202-1 to 202-12 is overwhelmingly large as compared with the wavelength of electromagnetic waves in a frequency band of several hundred MHz to server GHz for use by the radio devices.

Operation of Ninth Embodiment

In the transformer equipment supervisory 200 system of the present embodiment, electromagnetic waves experience multiple reflections by the plurality of power transformers 202-1 to 202-12. A multi-path interference environment is formed in the transformer equipment control system 200.

High-quality radio transmission between a terminal station radio device 203 and a base station radio device 213 of the present embodiment can be implemented even under the multi-path interference environment. Remote control and supervision of the power transformers 202-1 to 202-12 can be implemented by the plurality of radio base stations 211-1 to 211-4. Thus, it is possible to solve a problem of high voltage power induction which would be problematic in a case that cables or the like are used and no cost of running cable is needed. Enhancing the safety of the control/supervisory system of the power transformers 202-1 to 202-12 and cost reduction become feasible.

Advantageous Effect of Ninth Embodiment

The ninth embodiment described above has the following advantageous effect (K).

(K) According to the radio devices of the present embodiment, high-quality radio transmission can be implemented even under the multi-path interference environment. Control and supervision of the power transformers 202-1 to 202-12 can be implemented remotely by the plurality of radio base stations 211-1 to 211-4. Thus, it is possible to solve a problem of high voltage power induction which would be problematic in a case that wired connection means such as cables are used and the cost of running cable can be eliminated. Enhancing the safety of the control/control system of the power transformers 202-1 to 202-12 and cost reduction become feasible.

Modification

The present invention is not limited to the foregoing embodiments and changes may be made therein without departing from the spirit of the invention. As for utilization form and modification, for example, a modification (a) is as follows.

(a) The transmitting antennas 20-1, 20-2 and the receiving antenna 31 in the first through fifth embodiments are linearly polarized antennas in each case. However, the antennas are not so limited and may be circularly polarized antennas.

LIST OF REFERENCE SIGNS 10, 10E, 10F: Wireless transmitter
11: Information generator
12-1, 12-2: Variable oscillator
13-1, 13-22: Modulator
17: Baseband circuit
20-1, 20-2: Transmitting antenna
30, 30A, 30B, 30C, 30D, 30E, 30F: Wireless receiver
31: Receiving antenna
32: Mixer
33: Oscillator
34: receiving controller (controller R)
35: Low-pass filter (LPF)
35A: Variable band-pass filter (BPS)
36: Analog-digital converter (ADC) 36
40, 40C, 40D: delta-sigma modulator
41-1, 41-2, 41-3: Anti-phase signal combiner
42-1, 42-2: Resonator
43: Analog-digital converter (ADC)
44: Oscillator
45: Digital-analog converter (DAC)

46: Digital signal interpolator
47-1 to 47-3: Backward amplifier
48-1 to 48-3: Forward amplifier
51: Baseband circuit
100: Elevator system
200: Transformer equipment control system control system

The invention claimed is:

1. A wireless transmitter transmitting:
a first transmission wave having a first carrier frequency, modulated with an information signal having a predetermined frequency band; and
a second transmission wave having a second carrier frequency, modulated with the information signal, wherein
the wireless transmitter selects from a predetermined frequency band range a plurality of pairs of the first and second carrier frequencies to have a constant average frequency between the plurality of pairs of the first and second carrier frequencies, and a differential frequency that is a difference between the first carrier frequency and the second carrier frequency of each of the plurality of pairs of the first and second carrier frequencies is varied, and
the wireless transmitter includes a combiner-distributor combining the first carrier frequency with the second carrier frequency and distributing a combined signal and a phase shifter shifting a phase of one of the distributed signals and antennas transmitting another distributed signal and the phase shifted signal.

2. The wireless transmitter according to claim 1, wherein
the first carrier frequency and the second carrier frequency are made variable by selecting the first carrier frequency and the second carrier frequency from a frequency band divided into a plurality of channels;
the first transmission wave is transmitted using a first transmitting antenna; and
the second transmission wave is transmitted using a second transmitting antenna.

3. The wireless transmitter according to claim 2, wherein the information signals are transmitted according to a plurality of combinations of the first transmission wave and the second transmission wave, the information signals being different from each other.

4. A wireless receiver comprising:
a receiver that is configured to receive the first transmission wave and the second transmission wave transmitted by the wireless transmitter according to claim 1;
a detector that is configured to detect the differential frequency; and
a demodulator that is configured to demodulate the information signal having a predetermined frequency band carried with the differential frequency.

5. A wireless receiver comprising:
a detector that is configured to detect a differential frequency by using a delta-sigma modulator that comprises:
a first resonator to which a received signal from the wireless transmitter according to claim 1, is input, the first resonator having a resonant frequency equal to the first carrier frequency;
a second resonator to which the received signal is input, the second resonator having a resonant frequency equal to the second carrier frequency;
an analog-digital converter that performs sampling of an output signal of the first resonator and an output signal of the second resonator at a frequency equal to the average frequency;
a digital signal interpolator that interpolates signals sampled by the analog-digital converter;
a digital-analog converter that converts an output signal of the digital signal interpolator at a frequency that is an integral multiple of the average frequency; and
an anti-phase signal combiner that combines the received signal and an output signal of the digital-analog converter in anti-phase.

6. The wireless receiver according to claim 5, wherein the phase of a signal transfer function of the delta-sigma modulator is substantially zero at the first carrier frequency and the second carrier frequency.

7. The wireless receiver according to claim 5, further comprising a printed circuit board having the first resonator, the second resonator, the analog-digital converter, the digital signal interpolator, the digital-analog converter, and the anti-phase signal combiner mounted thereon.

8. A wireless communication system comprising a wireless transmitter according to claim 1, wherein
the wireless transmitter varies the differential frequency according to a predetermined sequence; and
the wireless receiver varies according to a predetermined sequence a detection frequency for detection and detects a combination of the differential frequency and the detection frequency making a maximum output of conversion according to a predetermined sequence, and demodulates the information signal having the predetermined frequency band.

9. The wireless communication system according to claim 8 further comprising:
a wireless receiver that comprises a detector that is configured to detect a differential frequency by using a delta-sigma modulator that comprises:
a first resonator to which a received signal from the wireless transmitter according to claim 1, is input, the first resonator having a resonant frequency equal to the first carrier frequency;
a second resonator to which the received signal is input, the second resonator having a resonant frequency equal to the second carrier frequency;
an analog-digital converter that performs sampling of an output signal of the first resonator and an output signal of the second resonator at a frequency equal to the average frequency;
a digital signal interpolator that interpolates signals sampled by the analog-digital converter;
a digital-analog converter that converts an output signal of the digital signal interpolator at a frequency that is an integral multiple of the average frequency; and
an anti-phase signal combiner that combines the received signal and an output signal of the digital-analog converter in anti-phase.

10. The wireless communication system according to claim 8, wherein
the predetermined sequence comprises a training mode and a communication mode,
in the training mode, the wireless transmitter, while varying the differential frequency, selects the differential frequency that provides to the highest receiving sensitivity at the wireless receiver; and
in the communication mode, the wireless transmitter and the wireless receiver perform communication using the first carrier frequency and the second carrier frequency, the difference between which corresponds to the differential frequency.

11. An elevator control system comprising:
the wireless communication system according to claim 8.

12. A transformer equipment control system comprising:
the wireless communication system according to claim 8.

13. A wireless transmitter transmitting:
a first transmission wave having a first carrier frequency, modulated with an information signal having a predetermined frequency band; and
a second transmission wave having a second carrier frequency, modulated with the information signal, wherein
the wireless transmitter selects from a predetermined frequency band range a plurality of pairs of the first and second carrier frequencies to have a constant average frequency between the plurality of pairs of the first and second carrier frequencies, and a differential frequency that is a difference between the first carrier frequency and the second carrier frequency of each of the plurality of pairs of the first and second carrier frequencies is varied,
performing detection with the differential frequency by using a delta-sigma modulator that comprises:
a first resonator to which a received signal from the wireless transmitter, is input, the first resonator having a resonant frequency equal to the first carrier frequency;
a second resonator to which the received signal is input, the second resonator having a resonant frequency equal to the second carrier frequency;
an analog-digital converter that performs sampling of an output signal of the first resonator and an output signal of the second resonator at a frequency equal to the average frequency;
a digital signal interpolator that interpolates signals sampled by the analog-digital converter;
a digital-analog converter that converts an output signal of the digital signal interpolator at a frequency that is an integral multiple of the average frequency; and
an anti-phase signal combiner that combines the received signal and an output signal of the digital-analog converter in anti-phase.

* * * * *